(12) United States Patent
Adams, Jr. et al.

(10) Patent No.: US 8,073,246 B2
(45) Date of Patent: Dec. 6, 2011

(54) MODIFYING COLOR AND PANCHROMATIC CHANNEL CFA IMAGE

(75) Inventors: James E. Adams, Jr., Rochester, NY (US); Aaron T. Deever, Pittsford, NY (US); Russell J. Palum, Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 612 days.

(21) Appl. No.: 12/266,824

(22) Filed: Nov. 7, 2008

(65) Prior Publication Data

US 2010/0119148 A1   May 13, 2010

(51) Int. Cl.
G06K 9/00 (2006.01)
G06K 9/40 (2006.01)

(52) U.S. Cl. ............... 382/162; 382/190; 382/266

(58) Field of Classification Search .......... 382/162–167, 382/190–200; 348/262–280
See application file for complete search history.

(56) References Cited

U.S. PATENT DOCUMENTS

| | | | |
|---|---|---|---|
| 3,971,065 A | 7/1976 | Bayer | |
| 4,984,279 A * | 1/1991 | Kidney et al. | 382/113 |
| 5,194,351 A * | 3/1993 | Roller | 430/45.31 |
| 5,641,596 A * | 6/1997 | Gray et al. | 430/21 |
| 5,949,914 A * | 9/1999 | Yuen | 382/254 |
| 6,441,848 B1 | 8/2002 | Tull | |
| 6,937,774 B1 | 8/2005 | Specht et al. | |
| 7,239,342 B2 | 7/2007 | Kingetsu et al. | |
| 7,340,099 B2 | 3/2008 | Zhang | |
| 2006/0017837 A1 | 1/2006 | Sorik et al. | |
| 2006/0187308 A1 | 8/2006 | Lim et al. | |
| 2007/0024931 A1 | 2/2007 | Compton et al. | |
| 2007/0046807 A1 | 3/2007 | Hamilton et al. | |
| 2007/0223831 A1 | 9/2007 | Mei et al. | |
| 2008/0012969 A1 | 1/2008 | Kasai et al. | |
| 2008/0129752 A1 | 6/2008 | Riley et al. | |
| 2010/0104209 A1 * | 4/2010 | Deever et al. | 382/260 |

* cited by examiner

*Primary Examiner* — Manav Seth
(74) *Attorney, Agent, or Firm* — Blakely Sokoloff Taylor & Zafman LLP

(57) ABSTRACT

A method of modifying a CFA image or full-color image having a plurality of color channels and a panchromatic channel, includes capturing the panchromatic channel at a different exposure time than at least one of the color image channels with the CFA sensor within one image; producing a panchromatic edge map and a color edge map from the CFA image; using the panchromatic edge map and the color edge map to provide motion estimates; and using the motion estimates to modify at least one of the channels of the CFA image or full-color image.

5 Claims, 9 Drawing Sheets

FIG. 6

| R$_{26}$ | G$_{27}$ |
| --- | --- |
| G$_{28}$ | B$_{29}$ |

FIG. 7

| G$_{30}$ | B$_{31}$ | G$_{32}$ | B$_{33}$ | G$_{34}$ |
| --- | --- | --- | --- | --- |
| R$_{35}$ | G$_{36}$ | R$_{37}$ | G$_{38}$ | R$_{39}$ |
| G$_{40}$ | B$_{41}$ | G$_{42}$ | B$_{43}$ | G$_{44}$ |
| R$_{45}$ | G$_{46}$ | R$_{47}$ | G$_{48}$ | R$_{49}$ |
| G$_{50}$ | B$_{51}$ | G$_{52}$ | B$_{53}$ | G$_{54}$ |

FIG. 4

| P$_1$ | R$_2$ | P$_3$ | G$_4$ | P$_5$ |
| --- | --- | --- | --- | --- |
| R$_6$ | P$_7$ | G$_8$ | P$_9$ | R$_{10}$ |
| P$_{11}$ | G$_{12}$ | P$_{13}$ | B$_{14}$ | P$_{15}$ |
| G$_{16}$ | P$_{17}$ | B$_{18}$ | P$_{19}$ | G$_{20}$ |
| P$_{21}$ | R$_{22}$ | P$_{23}$ | G$_{24}$ | P$_{25}$ |

FIG. 8

| F$_{1M}$ | F$_{2M}$ | F$_{3M}$ |
| --- | --- | --- |
| F$_{4M}$ | F$_{5M}$ | F$_{6M}$ |
| F$_{7M}$ | F$_{8M}$ | F$_{9M}$ |

MODIFYING COLOR AND PANCHROMATIC CHANNEL CFA IMAGE

CROSS REFERENCE TO RELATED APPLICATION

Reference is made to commonly assigned U.S. patent application Ser. No. 12/111,219 filed Apr. 29, 2008 by John F. Hamilton, Jr. et al, entitled "Concentric Exposure Sequence For Image Sensor", the disclosure of which is incorporated herein.

FIELD OF THE INVENTION

The present invention relates to color filter array images having color channels and a panchromatic channel and more particularly to providing a modified CFA image or full-color image.

BACKGROUND OF THE INVENTION

An electronic imaging system depends on a lens system to form an image on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). A sensor includes a two-dimensional array of individual picture element sensors, or pixels. Each pixel is typically provided with either a red, green, or blue filter, as described by Bayer in commonly assigned U.S. Pat. No. 3,971,065 so that a full-color image can be produced. Regardless of electronic technology employed, e.g., CCD or CMOS, the pixel acts as a bucket in which photoelectrons are accumulated in direct proportion to amount of light that strikes the pixel during the capture of an image by the electronic imaging system.

Not all of the light that enters the front optical element of an electronic imaging system strikes a pixel. Much of the light is lost when passing through the optical path of the electronic imaging system. Typically, about 5% of the light is lost due to lens reflections and haze and about 60% is lost because of the color filter array. Moreover, some of the light strikes areas of the pixel that are not light sensitive. To gather the amount of light that is needed to make a correct exposure, the electronic imaging sensor gathers light for an interval of time called the exposure time. Based on brightness measurements of the scene to be imaged, the electronic imaging system, typically an automatic exposure control, is employed to determine a suitable exposure time that will yield an image with effective brightness. The dimmer the scene, the larger the amount of time the electronic imaging system needs to gather light to make a correct exposure. It is well known, however, that longer exposures can result in blurry images. This blur can be the result of objects moving in a scene. It can also be produced when the image capture device is moving relative to the scene during capture.

One method to reduce blur is to shorten the exposure time. This method under-exposes the electronic image sensor during image capture so dark images are generated. An analog or digital gain can be applied to the image signal to brighten the dark images, but those skilled in the art will recognize that this will result in noisy images.

Another method to reduce blur is to shorten the exposure time and preserve more of the light that passes through the optical path and direct it to the pixels of the electronic image sensor. This method can produce images with reduced blur and acceptable noise levels. However, the current industry trend in electronic imaging systems is to make imaging systems smaller and less expensive. High-grade optical elements with large apertures, which can gather more light and preserve more light passing through them, are therefore not practicable.

Another method to reduce blur is to shorten the exposure time and supplement the available light with a photographic flash. A photographic flash produces a strong light flux that is sustained for a fraction of a second and the exposure time is set to encompass the flash time. The exposure time can be set to a significantly shorter interval than without a flash since the photographic flash is strong. Therefore, the blur during the exposure is reduced. However, objects in bright daylight can still have motion blur, flash photography is most useful if the distance between the flash and the object is small, and a flash adds extra cost and weight to an image capture device.

U.S. Pat. No. 6,441,848 to Tull describes a digital camera with an electronic image sensor that removes object motion blur by monitoring the rate at which electrons are collected by each pixel. If the rate at which light strikes a pixel varies, then the brightness of the image that the pixel is viewing is assumed to be changing. When a circuit built into the sensor array detects that the image brightness is changing, the amount of charge collected is preserved and the time at which brightness change was detected is recorded. Each pixel value where exposure was stopped is adjusted to the proper value by linearly extrapolating the pixel value so that the pixel value corresponds to the dynamic range of the entire image. A disadvantage of this approach is that the extrapolated pixel values, of an object that is already in motion when the exposure begins, are highly uncertain. The image brightness, as seen by the sensor, never has a constant value and, therefore, the uncertainty in the extrapolated pixel values results in an image with motion artifacts. Another disadvantage is that it uses specialized hardware so it cannot be used with the conventional electronic image sensors that are used in current commercial cameras.

Another method to reduce blur is to capture two images, one with a short exposure time, and one with a long exposure time. The short exposure time is selected so as to generate an image that is noisy, but relatively free of motion blur. The long exposure time is selected so as to generate an image that has little noise, but that can have significant motion blur. Image processing algorithms are used to combine the two captures into one final output image. Such approaches are described in U.S. Pat. No. 7,239,342, U.S. Patent Application Publication No. 2006/0017837, U.S. Patent Application Publication No. 2006/0187308 and U.S. Patent Application Publication No. 2007/0223831. The drawbacks of these approaches include a requirement for additional buffer memory to store multiple images, additional complexity to process multiple images, and difficulty resolving object motion blur.

Another method to reduce blur is to shorten exposure time and preserve more light passing through the color filter array. For silicon-based image sensors, the pixel components themselves are broadly sensitive to visible light, permitting unfiltered pixels to be suitable for capturing a monochrome image. For capturing color images, a two-dimensional pattern of filters is typically fabricated on the pattern of pixels, with different filter materials used to make individual pixels sensitive to only a portion of the visible light spectrum. An example of such a pattern of filters is the well-known Bayer color filter array pattern, as described in U.S. Pat. No. 3,971,065. The Bayer color filter array has advantages for obtaining full color images under typical conditions, however, this solution has been found to have its drawbacks. Although filters are needed to provide narrow-band spectral response, any filtering of the incident light tends to reduce the amount of light that reaches each pixel, thereby reducing the effective light sensitivity of each pixel and reducing pixel response speed.

As solutions for improving image capture under varying light conditions and for improving overall sensitivity of the imaging sensor, modifications to the familiar Bayer pattern have been disclosed. For example, commonly assigned U.S. Patent Application Publication No. 2007/0046807 by Hamilton et al. and U.S. Patent Application Publication No. 2007/0024931 by Compton et al. both describe alternative sensor arrangements that combine color filters with panchromatic filter elements, spatially interleaved in some manner. With this type of solution, some portion of the image sensor detects color; the other panchromatic portion is optimized to detect light spanning the visible band for improved dynamic range and sensitivity. These solutions thus provide a pattern of pixels, some pixels with color filters (providing a narrow-band spectral response) and some without (unfiltered "panchromatic" pixels or pixels filtered to provide a broad-band spectral response). This solution is not sufficient, however, to permit high quality images without motion blur to be captured under low-light conditions.

Another method to reduce blur and capture images in low-light scenarios, known in the fields of astrophotography and remote sensing, is to capture two images: a panchromatic image with high spatial resolution and a multi-spectral image with low spatial resolution. The images are fused to generate a multi-spectral image with high spatial resolution. Such approaches are described in U.S. Pat. Nos. 7,340,099, 6,937,774 and U.S. Patent Application Publication No. 2008/0129752. The drawbacks of these approaches include a requirement for additional buffer memory to store multiple images, and difficulty resolving object motion blur.

Thus, there exists a need for producing an improved color filter array image or full-color image having color and panchromatic pixels, having reduced motion blur, by using conventional electronic image sensors, without the use of a photographic flash, without increasing image noise, and without significant additional cost or complexity or memory requirements.

SUMMARY OF THE INVENTION

The object of this invention is to provide a modified CFA image or full-color image having color and panchromatic pixels.

This object is achieved by a method of modifying a CFA image or full-color image having a plurality of color channels and a panchromatic channel, comprising:

(a) capturing the panchromatic channel at a different exposure time than at least one of the color image channels with the CFA sensor within one image;

(b) producing a panchromatic edge map and a color edge map from the CFA image;

(c) using the panchromatic edge map and the color edge map to provide motion estimates; and (d) using the motion estimates to modify at least one of the channels of the CFA image or full-color image.

An advantage of the present invention is that improved color filter array images or full-color images with reduced blur can be produced with basic changes to the image processing software without having to use a photographic flash or long exposure times to properly expose a single image.

A further advantage of the present invention is that color filter array images or full-color images with reduced image capture device-induced blur can be produced without the need for costly special lenses with laterally moveable lens elements.

A further advantage of the present invention is that color filter array images or full-color images with reduced blur can be produced without increased buffer memory requirements for storing multiple images.

BRIEF DESCRIPTION OF THE DRAWINGS

FIG. 4 is a region of pixels used in block 218 in FIG. 3;

FIG. 6 is a region of pixels in block 238 in FIG. 5;

FIG. 7 is a region of pixels in block 238 in FIG. 5;

FIG. 8 is a region of pixels in block 250 in FIG. 5;

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
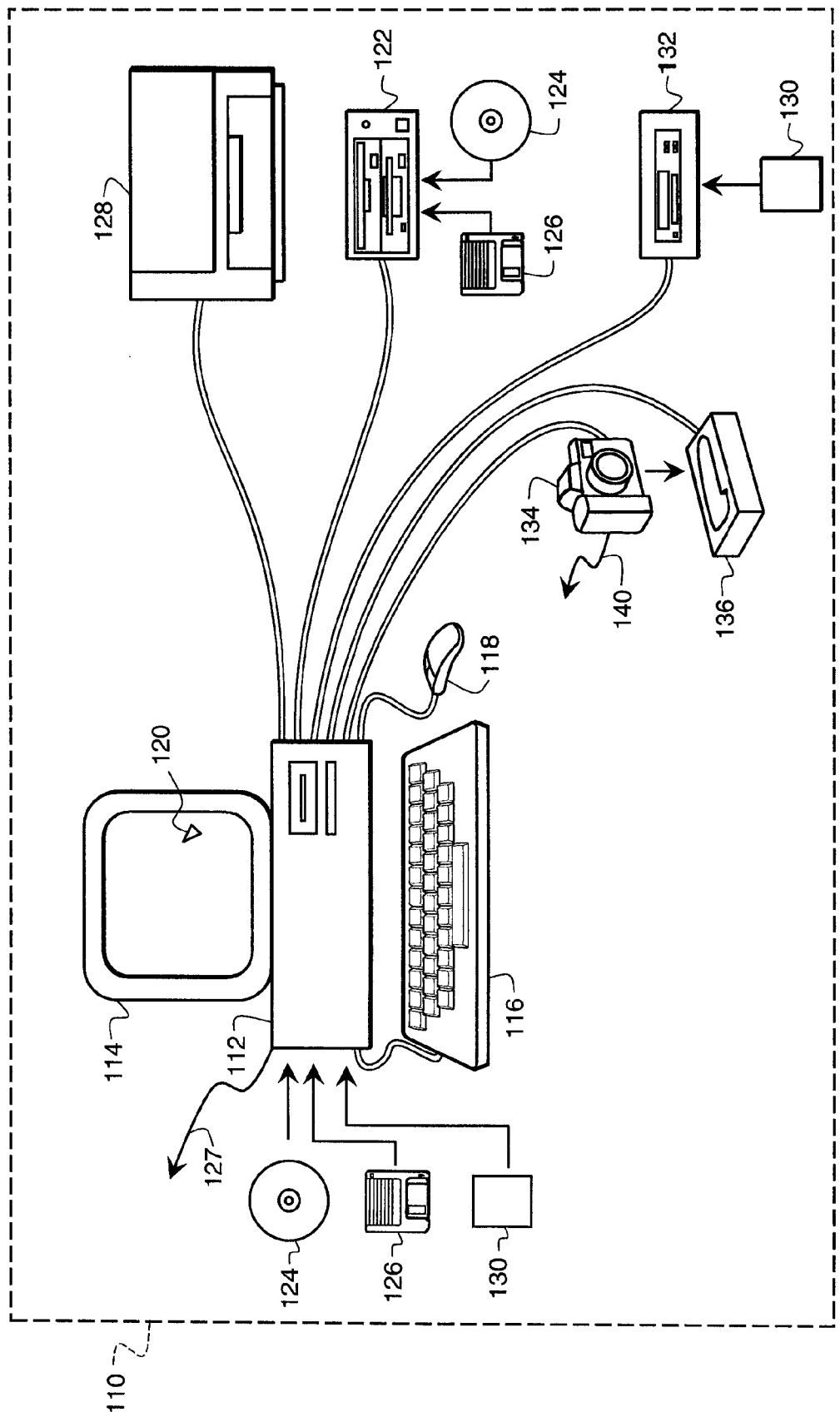
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a way of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or the floppy disk 126 can alternatively be inserted into externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) which contains digitized images electronically embodied in the PC card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images can also be input via the compact disk 124, the floppy disk 126, or the network connection 127. Any images stored in the PC card 130, the floppy disk 126 or the compact disk 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to interpolate sparsely populated images.

Figure 2:
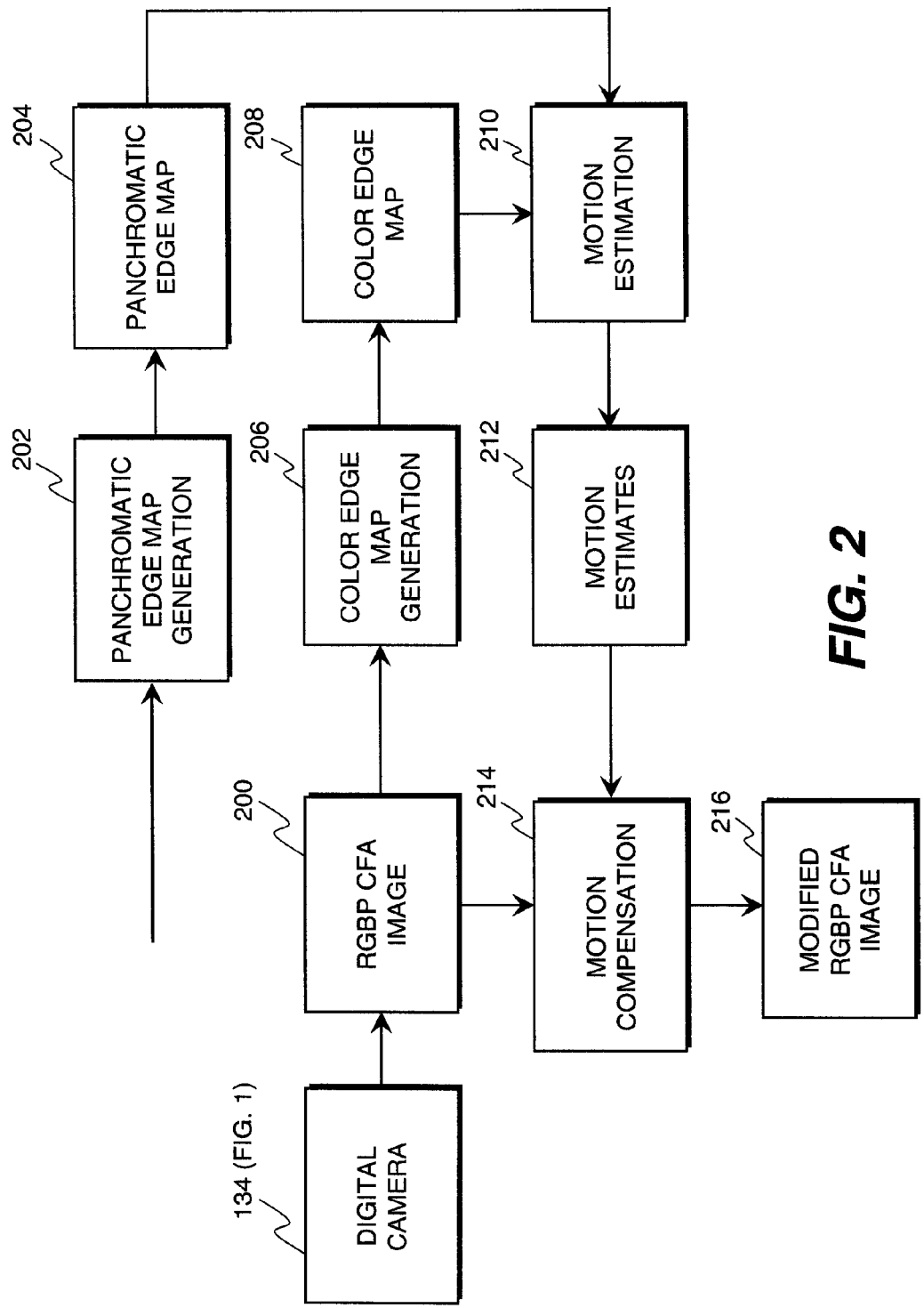
FIG. 2 is a block diagram of a preferred embodiment of the present invention.

FIG. 2 is a high level diagram of a preferred embodiment. The digital camera 134 is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. A panchromatic edge map generation block 202 produces a panchromatic edge map 204 from the RGBP CFA image 200. A color edge map generation block 206 produces a color edge map 208. A motion estimation block 210 produces motion estimates 212 from the panchromatic edge map 204 and the color edge map 208. A motion compensation block 214 produces a modified RGBP CFA image 216 from the RGBP CFA image 200 and the motion estimates 212.

Figure 3:
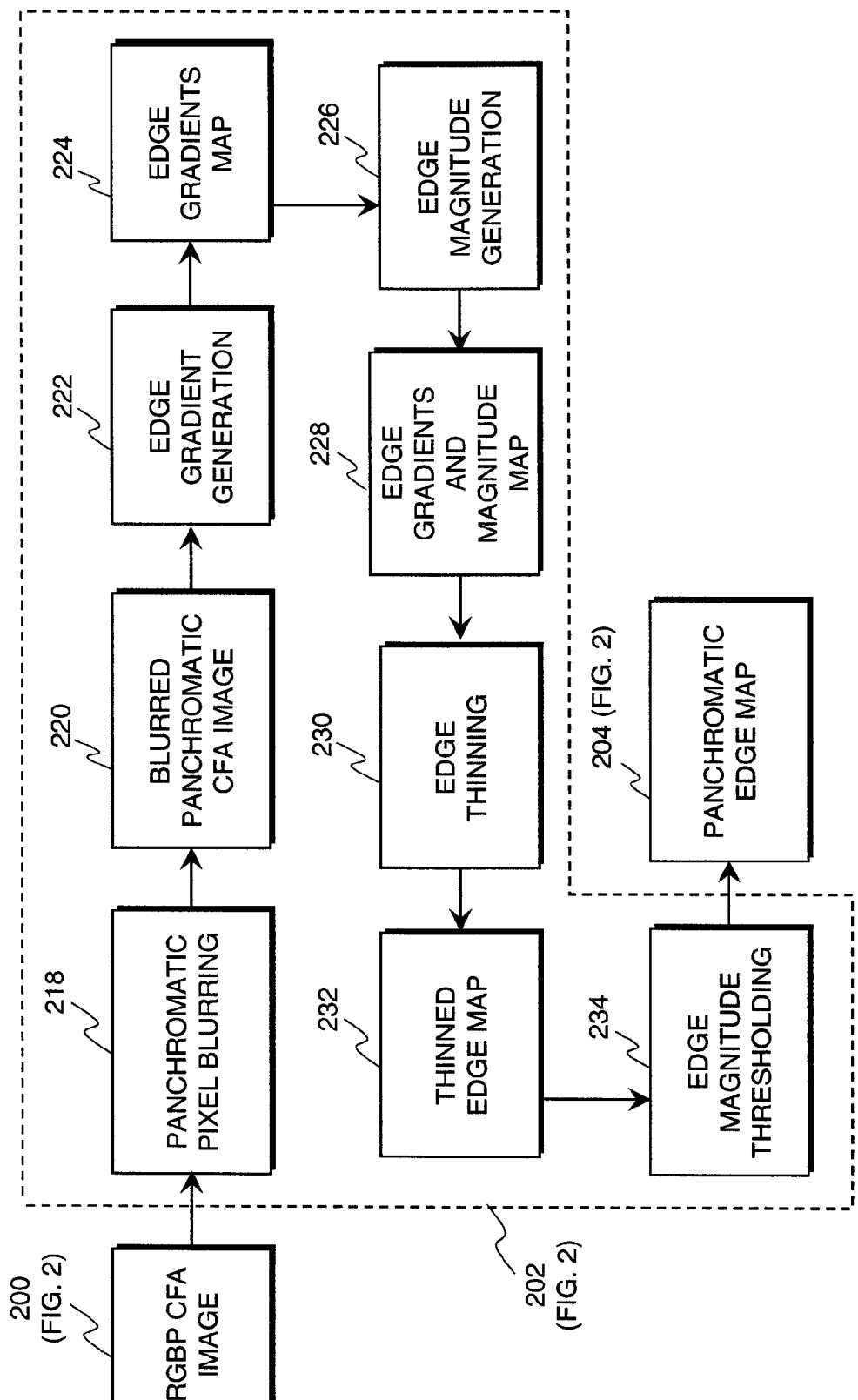
FIG. 3 is a block diagram showing block 202 in FIG. 2 in more detail.

FIG. 3 is a more detailed view of block 202 (FIG. 2) of the preferred embodiment. A panchromatic pixel blurring block 218 takes the RGBP CFA image 200 (FIG. 2) and produces a blurred panchromatic CFA image 220. An edge gradient generation block 222 takes the blurred panchromatic CFA image 220 and produces an edge gradients map 224. An edge magnitude generation block 226 produces an edge gradients and magnitude map 228 from the edge gradients map 224. An edge thinning block 230 produces a thinned edge map 232 from the edge gradients and magnitude map 228. Finally, an edge magnitude threshold block 232 produces the panchromatic edge map 204 (FIG. 2) from the thinned edge map 232.

In FIG. 3, the panchromatic pixel blurring block 218 can be performed in any appropriate way known to those skilled in the art. Referring to FIG. 4, one way to generate a blurred panchromatic value $P_{13B}$ for pixel $P_{13}$ is to compute a weighted average of the panchromatic pixel values within the neighborhood shown, such as:

$$P_{13B} = (P_1 + 2P_3 + P_5 + 2P_{11} + 4P_{13} + 2P_{15} + P_{21} + 2P_{23} + P_{25})/16$$

It will be evident to one skilled in the art that other sets of weights can be used.

Returning to FIG. 3, the edge gradient generation block 222 can be performed in any appropriate way known to those skilled in the art. Referring to FIG. 4, one way to generate panchromatic edge gradients $E_{14H}$ and $E_{14V}$ for pixel $B_{14}$ is to compute absolute differences from the adjacent blurred panchromatic pixels, such as:

$$E_{14H} = |P_{13B} - P_{15B}|$$

$$E_{14V} = |P_{9B} - P_{19B}|$$

This method will work for every nonpanchromatic pixel in FIG. 4. In the case of a panchromatic pixel, one way to generate panchromatic edge gradients $E_{13H}$ and $E_{13V}$ for pixel $P_{13}$ is to compute averages of absolute differences from the adjacent blurred panchromatic pixels, such as:

$$E_{13H} = (|P_{7B} - P_{9B}| + |P_{17B} - P_{19B}|)/2$$

$$E_{13V} = (|P_{7B} - P_{17B}| + |P_{9B} - P_{19B}|)/2$$

This method will work for every panchromatic pixel in FIG. 4. It will be evident to one skilled in the art that other methods of generating edge gradients can be used.

Returning to FIG. 3, the edge magnitude generation block 226 can be performed in any appropriate way known to those skilled in the art. Referring to FIG. 4, one way to generate panchromatic edge magnitude $E_{13M}$ is to sum the panchromatic edge gradients $E_{13H}$ and $E_{13V}$. This will work for all pixels in FIG. 4. It will be evident to one skilled in the art that other methods of generating edge magnitudes can be used.

Returning to FIG. 3, the edge thinning block 230 can be performed in any appropriate way known to those skilled in the art. Referring to FIG. 4, one way to generate thinned panchromatic edge magnitude $E_{13T}$ is by the method commonly known by those skilled in the art as nonmaximum suppression. The following pseudocode describes one example of this method for generating $E_{13T}$:

```
if E13H ≥ E13V
    if (E12M ≥ E13M) or (E14M ≥ E13M)
        E13T = 0
    else
        E13T = E13M
    end
else
    if (E8M ≥ E13M) or (E18M ≥ E13M)
        E13T = 0
    else
        E13T = E13M
    end
end
```

In words, if $E_{13M}$ is not larger than either of its horizontal or vertical neighboring values, then $E_{13T}$ is set to zero. Otherwise, $E_{13T}$ is set to $E_{13M}$. The horizontal processing versus the vertical processing direction decision is made based on the relative sizes of the panchromatic edge gradients $E_{13H}$ and $E_{13V}$.

Returning to FIG. 3, the edge magnitude thresholding block 234 can be performed in any appropriate way known to those skilled in the art. Referring to FIG. 4, one way to generate panchromatic edge map value $E_{13}$ is by the method commonly known by those skilled in the art as hard thresholding. Simply put, if $E_{13T}$ is greater than a supplied threshold value, then $E_{13}$ is set to $E_{13T}$. Otherwise, $E_{13}$ is set to zero. The supplied threshold value is the value that makes the resulting panchromatic edge map 204 (FIG. 2) free of spurious and weak edge features and noise and leaving only strong, visually well-defined edge features.

Figure 5:
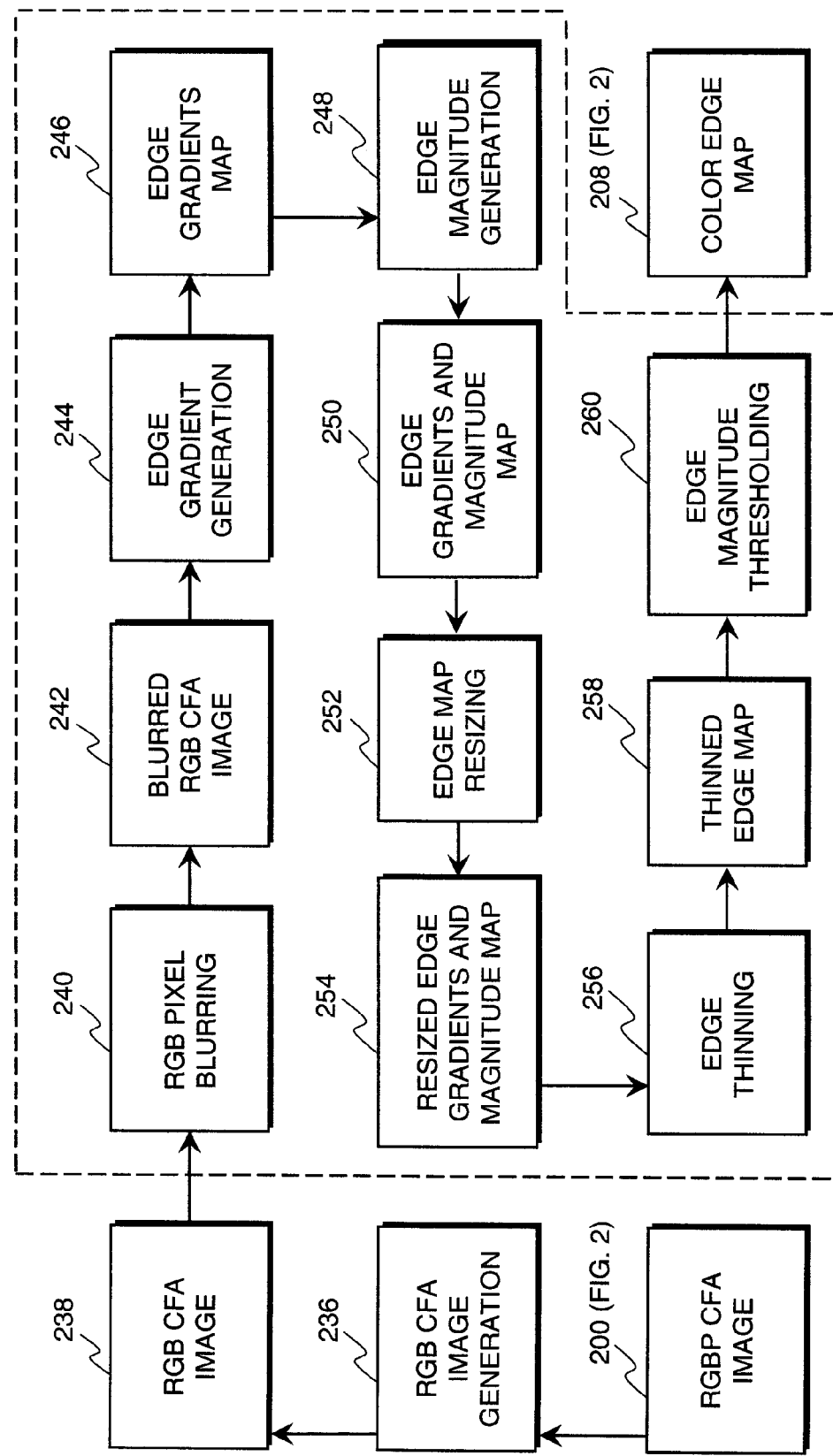
FIG. 5 is a block diagram showing block 206 in FIG. 2 in more detail.

FIG. 5 is a more detailed view of block 206 (FIG. 2) of the preferred embodiment. An RGB CFA image generation block 236 takes the RGBP CFA image 200 (FIG. 2) and produces an RGB CFA image 238. An RGB pixel blurring block 240 takes the RGB CFA image 238 and produces a blurred RGB CFA image 242. An edge gradient generation block 244 takes the blurred RGB CFA image 242 and produces an edge gradients map 246. An edge magnitude generation block 248 produces an edge gradients and magnitude map 250 from the edge gradients map 246. An edge map resizing block 252 produces a resized edge gradients and magnitude map 254 from the edge gradients and magnitude map 250. An edge thinning block 256 produces a thinned edge map 258 from the resized edge gradients and magnitude map 254. Finally, an edge magnitude threshold block 260 produces the color edge map 208 (FIG. 2) from the thinned edge map 258.

In FIG. 5, the RGB CFA image generation block 236 can be performed in any appropriate way known to those skilled in the art. FIG. 4 is an example of a portion of the RGBP CFA image 200 (FIG. 2). FIG. 6 is an example of a portion of the RGB CFA image 238. One way to generate an RGB CFA image value $R_{26}$ (FIG. 6) is to compute an average of red pixel values from the portion of the RGBP CFA image 200 (FIG. 2) shown in FIG. 4, such as:

$$R_{26}=(R_2+R_6)/2$$

In a similar manner, the other RGB CFA image values shown in FIG. 6 can be computed:

$$G_{27}=(G_4+G_8)/2$$

$$G_{28}=(G_{12}+G_{16})/2$$

$$B_{29}=(B_{14}+B_{18})/2$$

In anticipation of discussing the edge map resizing block 252 below, it is noted that the RGB CFA image 238 has one-quarter the number of pixels as does the RGBP CFA image 200 (FIG. 2).

Returning to FIG. 5, the RGB pixel blurring block 240 can be performed in any appropriate way known to those skilled in the art. Referring to FIG. 7, one way to generate a blurred green value $G_{42B}$ for pixel $G_{42}$ is to compute a weighted average of the green pixel values within the neighborhood shown, such as:

$$G_{42B}=(G_{30}+2G_{32}+G_{34}+2G_{40}+4G_{42}+2G_{44}+G_{50}+2G_{52}+G_{54})/16$$

A similar process would be applied to the red and blue pixels as well. It will be evident to one skilled in the art that other sets of weights can be used.

Returning to FIG. 5, the edge gradient generation block 244 can be performed in any appropriate way known to those skilled in the art. Referring to FIG. 7, one way to generate color edge gradients $F_{43H}$ and $F_{43V}$ for pixel $B_{43}$ is to compute absolute differences from the adjacent blurred green pixels, such as:

$$F_{43H}=|G_{42B}-G_{44B}|$$

$$F_{43V}=|G_{38B}-G_{48B}|$$

This method will work for every red and blue pixel in FIG. 7. In the case of a green pixel, one way to generate color edge gradients $F_{42H}$ and $F_{42V}$ for pixel $G_{42}$ is to compute averages of absolute differences from the adjacent blurred green pixels, such as:

$$F_{42H}=(|G_{36B}-G_{38B}|+|G_{46B}-G_{48B}|)/2$$

$$F_{42V}=(|G_{36B}-G_{46B}|+|G_{38B}-G_{48B}|)/2$$

This method will work for every green pixel in FIG. 7. It will be evident to one skilled in the art that other methods of generating edge gradients can be used.

Returning to FIG. 5, the edge magnitude generation block 248 can be performed in any appropriate way known to those skilled in the art. Referring to FIG. 7, one way to generate color edge magnitude $F_{42M}$ is to sum the color edge gradients $F_{42H}$ and $F_{42V}$. This will work for all pixels in FIG. 7. It will be evident to one skilled in the art that other methods of generating edge magnitudes can be used.

Returning to FIG. 5, the edge map resizing block 252 can be performed in any appropriate way known to those skilled in the art. As mentioned above when describing the RGB CFA image generation block 236, since the RGB CFA image 238 has one-quarter the number of pixels as does the RGBP CFA image 200 (FIG. 2), the edge gradients and magnitude map 250 also has one-quarter the number of pixels as does the RGBP CFA image 200 (FIG. 2). The edge gradients and magnitude map 250 includes the color edge gradients $F_H$ and $F_V$, as well as the color edge magnitudes $F_M$. In order to produce a resized edge gradients and magnitude map 254 with the same number of pixels as the RGBP CFA image 200

(FIG. 2), the dimensions (number of rows and columns) of the edge gradients and magnitude map 250 need to be doubled. This can be accomplished using any standard interpolation technique, such a bilinear interpolation or bicubic interpolation. The method of the preferred embodiment is to use bilinear interpolation. Referring to FIG. 8, the color edge magnitude values $F_{1M}$, $F_{3M}$, $F_{7M}$, and $F_{9M}$ are from the edge gradients and magnitude map 250. The edge map resizing block 252 computes the other color edge magnitude values in the following manner:

$$F_{2M} = (F_{1M} + F_{3M})/2$$

$$F_{4M} = (F_{1M} + F_{7M})/2$$

$$F_{5M} = (F_{1M} + F_{3M} + F_{7M} + F_{9M})/4$$

$$F_{6M} = (F_{3M} + F_{9M})/2$$

$$F_{8M} = (F_{7M} + F_{9M})/2$$

Returning to FIG. 5, the edge thinning block 256 can be performed in any appropriate way known to those skilled in the art. Referring to FIG. 8, one way to generate thinned color edge magnitude $F_{5T}$ is by the method commonly known by those skilled in the art as nonmaximum suppression. The following pseudocode describes one example of this method for generating $F_{5T}$:

```
if F_SH ≥ F_5V
    if (F_4M ≥ F_5M) or (F_6M ≥ E_5M)
        F_5T = 0
    else
        F_5T = F_5M
    end
else
    if (F_2M ≥ F_5M) or (F_8M ≥ F_5M)
        F_5T = 0
    else
        F_5T = F_5M
    end
end
```

In words, if $F_{5M}$ is not larger than either of its horizontal or vertical neighboring values, then $F_{5T}$ is set to zero. Otherwise, $F_{5T}$ is set to $F_{5M}$. The horizontal processing versus the vertical processing direction decision is made based on the relative sizes of the panchromatic edge gradients $F_{5H}$ and $F_{5V}$.

Returning to FIG. 5, the edge magnitude thresholding block 260 can be performed in any appropriate way known to those skilled in the art. Referring to FIG. 8, one way to generate color edge map value $F_5$ is by the method commonly known by those skilled in the art as hard thresholding. Simply put, if $F_{5T}$ is greater than a supplied threshold value, then $F_5$ is set to $F_{5T}$. Otherwise, $F_5$ is set to zero. The supplied threshold value is the value that makes the resulting color edge map 208 (FIG. 2) free of spurious and weak edge features and noise and leaving only strong, visually well-defined edge features.

Figure 9:
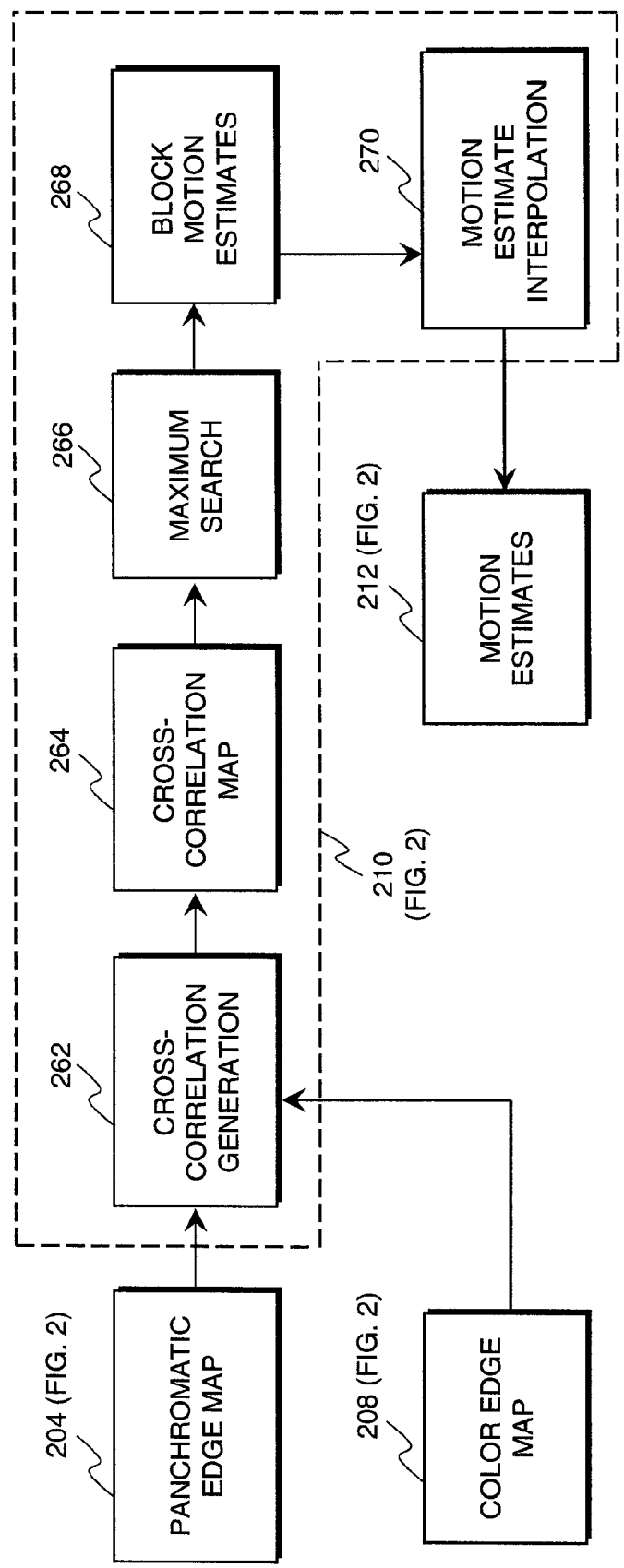
FIG. 9 is a block diagram showing block 210 in FIG. 2 in more detail.

FIG. 9 is a more detailed view of block 210 (FIG. 2) of the preferred embodiment. A cross-correlation generation block 262 takes the panchromatic edge map 204 (FIG. 2) and the color edge map 208 (FIG. 2) and produces a cross-correlation map 264. A maximum search block 266 takes the cross-correlation map 264 and produces block motion estimates 268. A motion estimate interpolation block 270 takes the block motion estimates 268 and produces the motion estimates 212 (FIG. 2).

Figure 10:
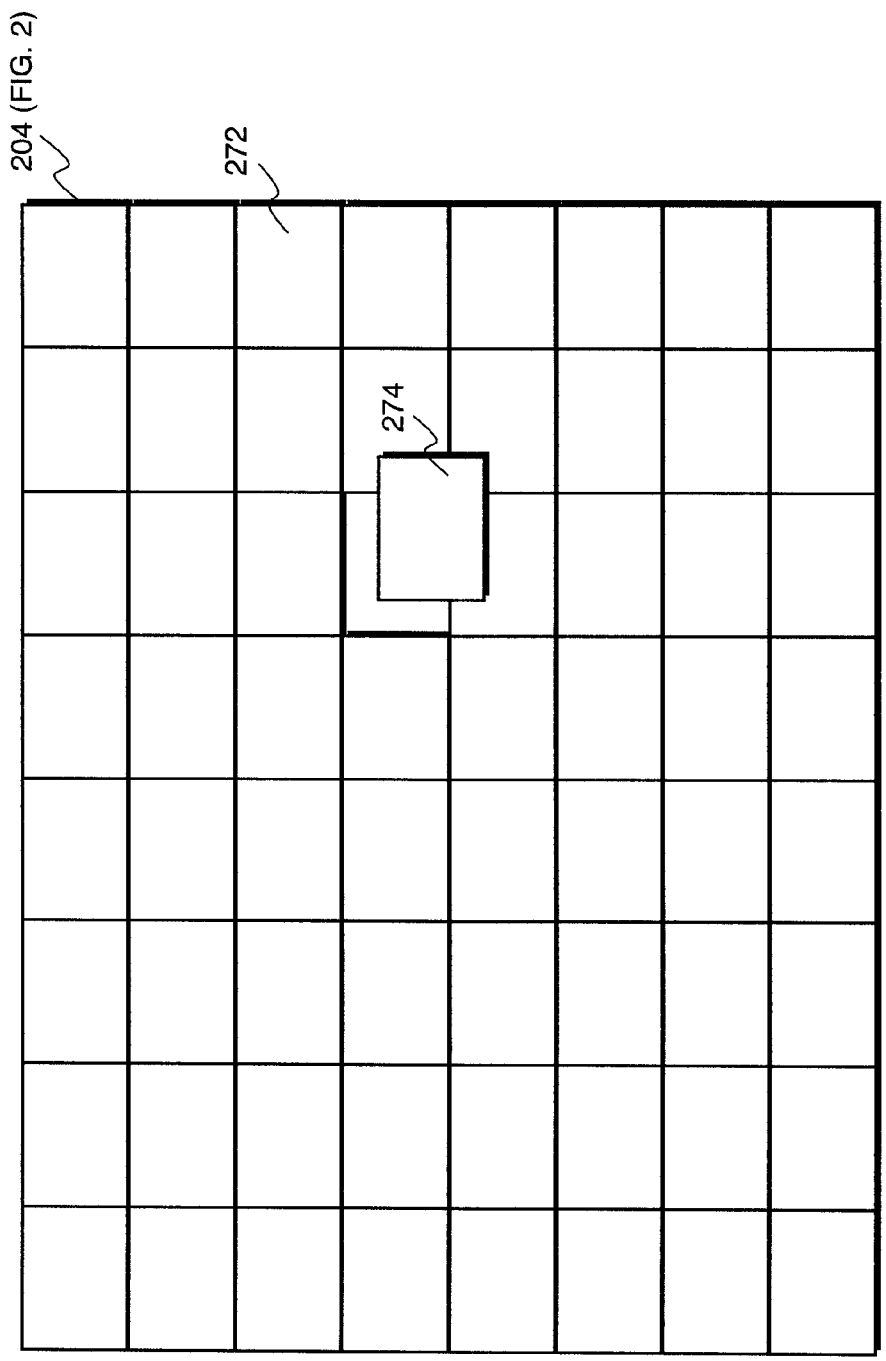
FIG. 10 is a figure of block 204 in FIG. 2 in more detail.

In FIG. 9, the cross-correlation generation block 262 can be performed in any manner know to those skilled in the art. Referring to FIG. 10, in the preferred embodiment the panchromatic edge map 204 (FIG. 2) is segmented into an 8×8 array of region blocks 272. Each region block 272 includes $1/64^{th}$ of the original edge map. To generate a cross-correlation map 264 (FIG. 9) for each region block 272, the region block 272 is shifted some number of rows and columns in location and the resulting shifted region block 274 is compared to the (unshifted) color edge map 208 (FIG. 2). For each pixel location in the shifted region block 274 (i.e., (i,j)∈B) the following summation is computed.

$$C(i_s, j_s) = \sum_{(i,j) \in B} \min[E(i + i_s, j + j_s), F(i, j)]$$

In this equation E is the value from the shifted region block 274 and F is the value from the color edge map 208 (FIG. 2). The amount of the shift is $i_s$ rows and $j_s$ columns. C is the value of the cross-correlation map 264 (FIG. 9). The min( ) function returns the smaller of the two values. In the preferred embodiment the values of $i_s$ and $j_s$ range from −7 to 7 resulting it the cross-correlation map 264 (FIG. 9) including a 15×15 array of values.

Returning to FIG. 9, the maximum search block 266 searches the cross-correlation map 264 for the location $(i_s,j_s)$ of the largest value within the cross-correlation map 264. This particular $(i_s,j_s)$ value becomes the block motion estimate for the given region block 272 (FIG. 10). All such block motion estimates together become the block motion estimates 268 for the panchromatic edge map 204 (FIG. 2). As a result, the block motion estimates 268 includes an 8×8 array of values.

Returning to FIG. 9, the motion estimate interpolation block 270 produces motion estimates 212 (FIG. 2) for each pixel location in the panchromatic edge map 204 (FIG. 2) by interpolating the block motion estimates 268. This interpolation can be performed in any manner know to those skilled in the art. In the preferred embodiment bilinear interpolation is used. Each of the block motion estimates 268 are considered to correspond the centers of each region block 272 (FIG. 10). These values are subsequently interpolated to every other location in the panchromatic edge map 204 (FIG. 2).

Figure 11:
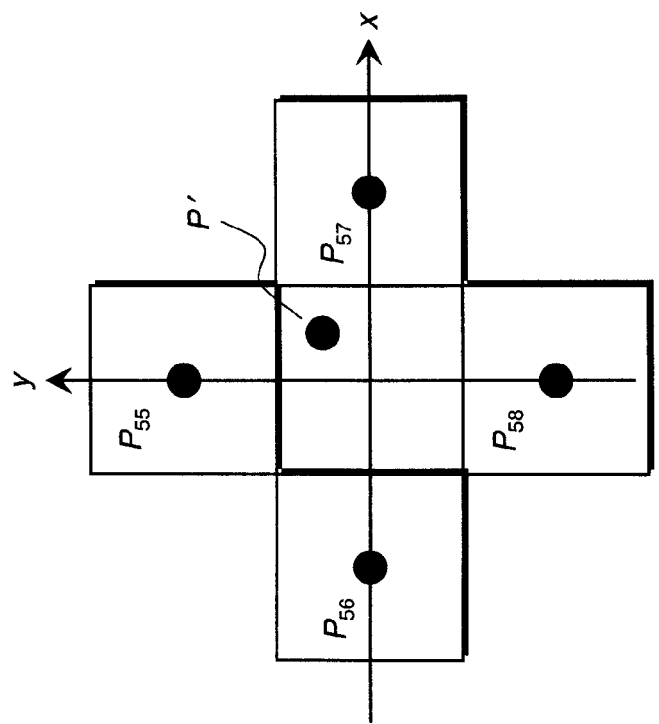
FIG. 11 is a region of pixels in block 200 in FIG. 2.

Returning to FIG. 2, the motion compensation block 214 replaces the panchromatic values in the RGBP CFA image 200 by interpolated panchromatic values indicated by the motion estimates 212. FIG. 11 illustrates a typical situation. The motion estimate 212 (FIG. 2) for pixel $P_{56}$ indicates that the value at $P_{56}$ is to be replaced with the value at P'. There is no pixel centered on P', so the value must be interpolated. This is done in the preferred embodiment though bilinear interpolation. It is assumed that the coordinate positions of the four panchromatic pixels in FIG. 11 are as follows: $P_{56}(-1,0)$, $P_{55}(0,1)$, $P_{57}(1,0)$, and $P_{58}(0,-1)$. The coordinates of the desired position are P'(x,y). By way of the following affine transforms the setup in FIG. 11 is transformed into the setup in FIG. 12.

$$\begin{cases} x'' = \dfrac{1 + x - y}{2} \\ y'' = \dfrac{1 + x + y}{2} \end{cases}$$

Figure 12:
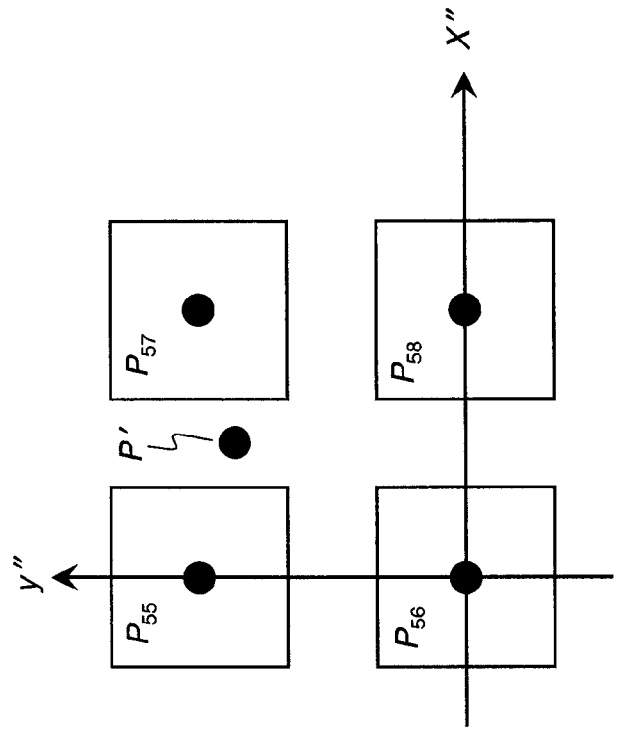
FIG. 12 is a region of pixels produced in block 214 in FIG. 2.

The coordinates of the panchromatic pixels in FIG. 12 are now $P_{56}(0,0)$, $P_{55}(0,1)$, $P_{57}(1,1)$, and $P_{58}(1,0)$. The coordinates of the desired position are P'(x",y"). FIG. 12 is now a standard bilinear interpolation problem and the answer is given by the following expression.

$$P' = (P_{58} - P_{56})x'' + (P_{55} - P_{56})y'' + (P_{57} + P_{56} - P_{55} - P_{58})x''y'' + P_{56}$$

Figure 13:
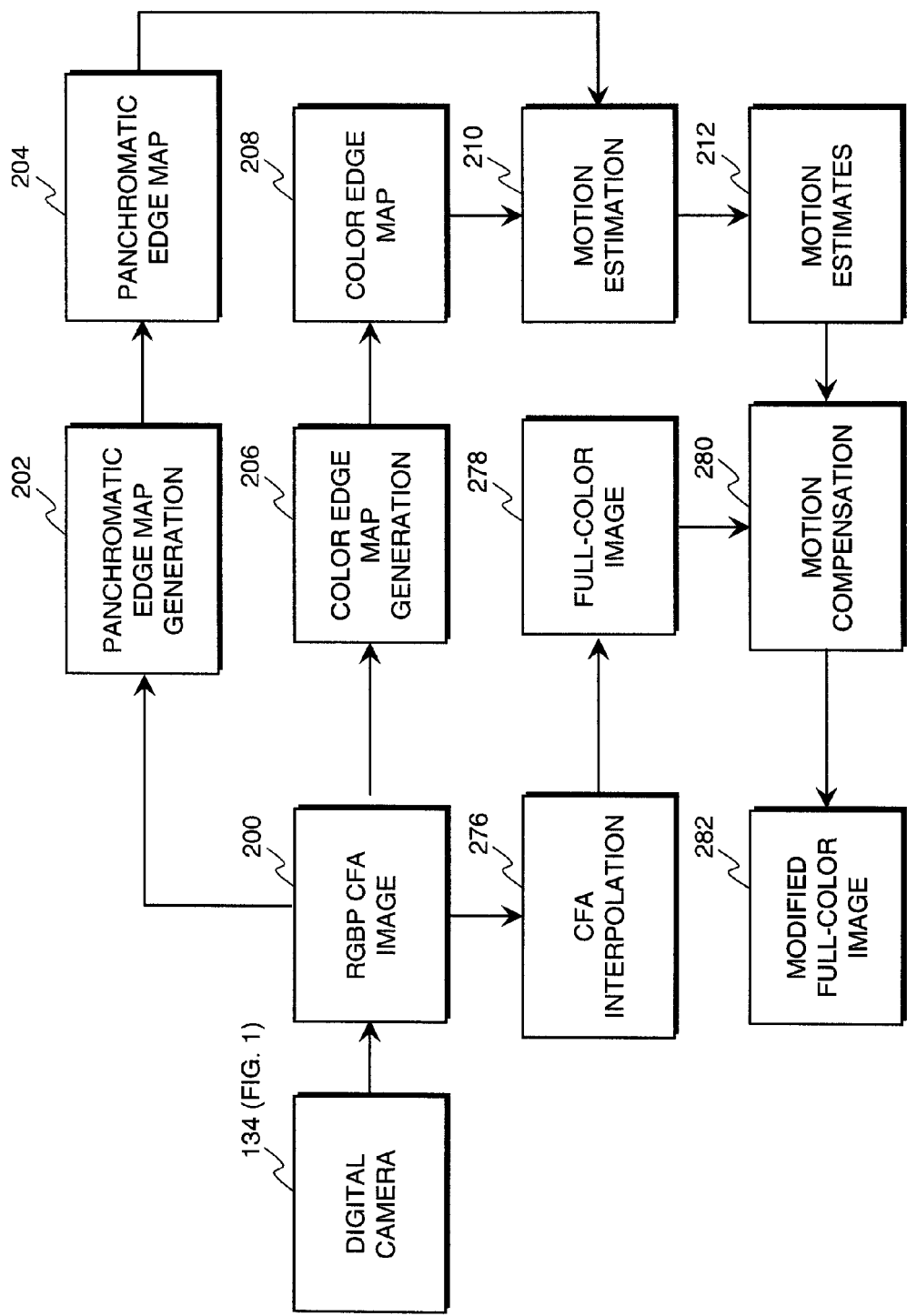
FIG. 13 is a block diagram of an alternate embodiment of the present invention.

FIG. 13 is a high level diagram of an alternate embodiment. The digital camera 134 (FIG. 1) produces an RGBP CFA image 200. A panchromatic edge map generation block 202 produces a panchromatic edge map 204 from the RGBP CFA image 200. A color edge map generation block 206 produces a color edge map 208. A motion estimation block 210 produces motion estimates 212 from the panchromatic edge map 204 and the color edge map 208. A CFA interpolation block 276 produces a full-color image 278 from the RGBP CFA image 200. A motion compensation block 280 produces a modified full-color image 282 from the full-color image 278 and the motion estimates 212.

In FIG. 13, blocks 200 through 212 have been discussed under the preferred embodiment. The CFA interpolation block 276 can be performed as described in U.S. Patent Application Publication No. 2007/0248753. The resulting full-color image 278 includes full-resolution red, green, blue, and panchromatic channels. The motion compensation block 280 operates on the full-resolution panchromatic channel of the full-color image 278. Since the panchromatic pixel values in the full-color image 278 are already arranged as in FIG. 12, the method of the previously discussed motion compensation block 214 (FIG. 2) can be used by simply omitting the initial affine transform step. The modified full-color image 282 will include full-resolution red, green, blue, and motion compensated panchromatic channels.

The motion compensation algorithms disclosed in the preferred embodiments of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the motion compensation algorithms can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithms themselves can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithms can interface with a variety of workflow user interface schemes.

The motion compensation algorithms disclosed herein in accordance with the invention can have interior components that utilize various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

| PARTS LIST | |
|---|---|
| 110 | Computer System |
| 112 | Microprocessor-based Unit |
| 114 | Display |
| 116 | Keyboard |
| 118 | Mouse |
| 120 | Selector on Display |
| 122 | Disk Drive Unit |
| 124 | Compact Disk - read Only Memory (CD-ROM) |
| 126 | Floppy Disk |
| 127 | Network Connection |
| 128 | Printer |
| 130 | Personal Computer Card (PC card) |
| 132 | PC Card Reader |
| 134 | Digital Camera |
| 136 | Camera Docking Port |
| 138 | Cable Connection |
| 140 | Wireless Connection |
| 200 | RGBP CFA Image |
| 202 | Panchromatic Edge Map Generation |
| 204 | Panchromatic Edge Map |
| 206 | Color Edge Map Generation |
| 208 | Color Edge Map |
| 210 | Motion Estimation |
| 212 | Motion Estimates |
| 214 | Motion Compensation |
| 216 | Modified RGBP CFA Image |
| 218 | Panchromatic Pixel Blurring |
| 220 | Blurred Panchromatic CFA Image |
| 222 | Edge Gradient Generation |
| 224 | Edge Gradients Map |
| 226 | Edge Magnitude Generation |
| 228 | Edge Gradients and Magnitude Map |
| 230 | Edge Thinning |
| 232 | Thinned Edge Map |
| 234 | Edge Magnitude Thresholding |
| 236 | RGB CFA Image Generation |
| 238 | RGB CFA Image |
| 240 | RGB Pixel Blurring |
| 242 | Blurred RGB CFA Image |
| 244 | Edge Gradient Generation |
| 246 | Edge Gradients Map |
| 248 | Edge Magnitude Generation |
| 250 | Edge Gradients and Magnitude Map |
| 252 | Edge Map Resizing |
| 254 | Resized Edge Gradients and Magnitude Map |
| 256 | Edge Thinning |
| 258 | Thinned Edge Map |
| 260 | Edge Magnitude Thresholding |
| 262 | Cross-Correlation Generation |
| 264 | Cross-Correlation Map |
| 266 | Maximum Search |
| 268 | Block Motion Estimates |
| 270 | Motion Estimate Interpolation |
| 272 | Region Block |
| 274 | Shifted Region Block |
| 276 | CFA Interpolation |
| 278 | Full-Color Image |
| 280 | Motion Compensation |
| 282 | Modified Full-Color Image |

The invention claimed is:

1. A method of modifying a CFA image or full-color image having a plurality of color channels and a panchromatic channel, comprising:
   (a) capturing the panchromatic channel at a different exposure time than at least one of the color image channels with the CFA sensor within one image;
   (b) producing a panchromatic edge map and a color edge map from the CFA image;
   (c) using the panchromatic edge map and the color edge map to provide motion estimates; and
   (d) using the motion estimates to modify at least one of the channels of the CFA image or full-color image.

2. The method of claim 1, wherein step (b) further includes
   (a) producing a blurred panchromatic CFA image from the CFA image;
   (b) producing an edge gradients map from the blurred panchromatic CFA image;
   (c) producing an edge gradients and magnitude map from the edge gradients map;
   (d) producing a thinned edge map from the edge gradients and magnitude map; and
   (e) producing the panchromatic edge map from the thinned edge map.

3. The method of claim 1, wherein step (b) further includes
   (a) producing an RGB CFA image from the CFA image;
   (b) producing a blurred RGB CFA image from the RGB CFA image;
   (c) producing an edge gradients map from the blurred RGB CFA image;
   (d) producing an edge gradients and magnitude map from the edge gradients map;
   (e) producing a resized edge gradients and magnitude map from the edge gradients and magnitude map;
   (f) producing a thinned edge map from the resized edge gradients and magnitude map; and
   (g) producing the color edge map from the thinned edge map.

4. The method of claim 1, wherein step (c) further includes
   (a) producing a cross-correlation map from the panchromatic edge map;
   (b) producing block motion estimates from the cross-correlation map; and
   (c) producing the motion estimates from the block motion estimates.

5. The method of claim 1 wherein step (d) further includes using the motion estimates to modify the panchromatic channel of the CFA image or full-color image.

\* \* \* \* \*